US012407845B2

(12) United States Patent
Zhao et al.

(10) Patent No.: US 12,407,845 B2
(45) Date of Patent: Sep. 2, 2025

(54) REFINED INTRA PREDICTION ANGLES

(71) Applicant: Tencent America LLC, Palo Alto, CA (US)

(72) Inventors: Liang Zhao, Sunnyvale, CA (US); Xin Zhao, Santa Clara, CA (US); Jing Ye, San Jose, CA (US); Han Gao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 140 days.

(21) Appl. No.: 18/215,284

(22) Filed: Jun. 28, 2023

(65) Prior Publication Data
US 2024/0275998 A1 Aug. 15, 2024

Related U.S. Application Data

(60) Provisional application No. 63/445,190, filed on Feb. 13, 2023.

(51) Int. Cl.
H04N 19/44 (2014.01)
H04N 19/176 (2014.01)
H04N 19/593 (2014.01)

(52) U.S. Cl.
CPC .......... *H04N 19/44* (2014.11); *H04N 19/176* (2014.11); *H04N 19/593* (2014.11)

(58) Field of Classification Search
CPC .... H04N 19/44; H04N 19/176; H04N 19/593; H04N 19/11
USPC ........................................................ 375/240
See application file for complete search history.

(56) References Cited

U.S. PATENT DOCUMENTS

| 2023/0024538 | A1* | 1/2023 | Zhao .................... H04N 19/176 |
| 2023/0231992 | A1* | 7/2023 | Chen .................... H04N 19/537 |
| | | | 375/240.02 |
| 2024/0259565 | A1* | 8/2024 | Filippov ................ H04N 19/11 |

OTHER PUBLICATIONS

B. Bross, J. Chen, S. Liu, and Y.-K. Wang, "Versatile Video Coding Editorial Refinements on Draft 10", Joint Video Experts Team (JVET) of ITU-T SG 16 WP 3 and ISO/IEC JTC 1/SC 29, 20th Meeting, Oct. 7-16, 2020, JVET-T2001, pp. 1-511.

Rivaz et al., AV1 Bitstream & Decoding Process Specification the Alliance for Open Media 681, Jan. 8, 2019, pp. 1-681.

(Continued)

*Primary Examiner* — Susan E. Hodges
(74) *Attorney, Agent, or Firm* — ArentFox Schiff LLP

(57) ABSTRACT

Processing circuitry receives, from a coded video bitstream, coded information of a current coding block in a current picture. The coded information is indicative of a directional intra prediction of the current coding block. The processing circuitry determines an index to an entry in an angle-to-offset mapping lookup table according to the coded information of current coding block. The angle-to-offset mapping lookup table stores a set of derivative values that are associated with angles, the set of derivative values includes two or more integers that are powers of two. The processing circuitry accesses the entry to obtain a derivative value, determines, for a pixel in the current coding block, an offset indicative of a reference location in the current picture according to the derivative value and a location of the pixel, and reconstructs the pixel in the current coding block based on the reference location in the current picture.

14 Claims, 17 Drawing Sheets

(56) References Cited

OTHER PUBLICATIONS

Chen et al., An Overview of Core Coding Tools in the AV1 Video Codec, 2018 Picture Coding Symposium (PCS), San Francisco, CA, USA, 2018, pp. 41-45.

Xin Zhao, Shan Liu, Adrian Grange, and Andrey Norkin, "Tool Description for AV1 and libaom," Alliance for Open Media, Codec Working Group, Document: CWG-B078, Oct. 4, 2021, pp. 1-41.

Elliott Karpilovsky, Debargha Mukherjee, "Proposal: New Inter Modes for AV2," Alliance for Open Media, Codec Working Group, Document: CWG-B018_v1, Feb. 24, 2021, pp. 1-6.

Keng-Shih Lu, Sarah Parker, and Debargha Mukherjee, "Optical Flow Motion Vector Refinement for AV2", Alliance for Open Media, Codec Working Group, Document: CWG-B041_v3, Sep. 20, 2021, pp. 1-11.

Leo Zhao, Xin Zhao, Shan Liu, "Advanced motion vector difference coding", Alliance for Open Media, Codec Working Group, Document: CWG-B092, Nov. 24, 2021, pp. 1-7.

Leo Zhao, Xin Zhao, Shan Liu, "Improved adaptive MVD resolution", Alliance for Open Media, Codec Working Group, Document: CWG-C011-v3, Feb. 9, 2022, pp. 1-7.

L. Zhao, X. Zhao, S. Liu, X. Li, J. Lainema, G. Rath, F. Urban, F. Racapé, "Wide Angular Intra Prediction for Versatile Video Coding," 2019 Data Compression Conference (DCC), Snowbird, UT, USA, 2019, pp. 53-62.

Y.-J. Chang, H.-J. Jhu, H.-Y. Jian, L. Zhao, X. Zhao, X. Li, S. Liu, B. Bross, P. Keydel, H. Schwarz, D. Marpe, and T. Wiegand, "Intra prediction using multiple reference lines for the versatile video coding standard," Proc. SPIE 11137, Applications of Digital Image Processing XLII, 1113716, Sep. 2019, pp. 1-8.

L. Zhao, X. Zhao, and S. Liu, "Improved Intra Coding Beyond AV1 Using Adaptive Prediction Angles and Reference Lines," IEEE International Conference on Image Processing (ICIP), Abu Dhabi, United Arab Emirates, Sep. 2020, pp. 1-5.

Yize Jin, Liang Zhao, Xin Zhao, Shan Liu, Alan. C. Bovik, "Improved Intra Mode Coding Beyond Av1", Acoustics Speech and Signal Processing (ICASSP) ICASSP 2021—2021 IEEE International Conference on, pp. 1580-1584, 2021, pp. 1-5.

Mohammed Golam Sarwer, and Yan Ye, "Offset based refinement for intra prediction (ORIP)," Alliance for Open Media, Codec Working Group, CWG-B019, 2021, pp. 1-9.

* cited by examiner

```
static const int16_t dr_intra_derivative[90] = {
  // More evenly spread out angles and limited to 10-bit
  // Values that are 0 will never be used
  //                Approx angle
  0,    0, 0,    //
  1023, 0, 0,    // 3, ...
  547,  0, 0,    // 6, ...
  372,  0, 0, 0, 0, // 9, ...
  273,  0, 0,    // 14, ...
  215,  0, 0,    // 17, ...
  178,  0, 0,    // 20, ...
  151,  0, 0,    // 23, ... (113 & 203 are base angles)
  132,  0, 0,    // 26, ...
  116,  0, 0,    // 29, ...
  102,  0, 0, 0, // 32, ...
  90,   0, 0,    // 36, ...
  80,   0, 0,    // 39, ...
  71,   0, 0,    // 42, ...
  64,   0, 0,    // 45, ... (45 & 135 are base angles)
  57,   0, 0,    // 48, ...
  51,   0, 0,    // 51, ...
  45,   0, 0, 0, // 54, ...
  40,   0, 0,    // 58, ...
  35,   0, 0,    // 61, ...
  31,   0, 0,    // 64, ...
  27,   0, 0,    // 67, ... (67 & 157 are base angles)
  23,   0, 0,    // 70, ...
  19,   0, 0,    // 73, ...
  15,   0, 0, 0, 0, // 76, ...
  11,   0, 0,    // 81, ...
  7,    0, 0,    // 84, ...
  3,    0, 0,    // 87, ...
};
```

*FIG. 5*

| k | $W_{k0}$ | $W_{k1}$ | $W_{k2}$ | $W_{k3}$ | $W_{k4}$ | $W_{k5}$ | $W_{k6}$ | $W_{k7}$ | $W_{k8}$ |
|---|---|---|---|---|---|---|---|---|---|
| 0 | 4 | 16 | 4 | 0 | 0 | 16 | 4 | 0 | 0 |
| 1 | 2 | 4 | 16 | 4 | 0 | 8 | 2 | 0 | 0 |
| 2 | 1 | 0 | 4 | 16 | 4 | 4 | 1 | 0 | 0 |
| 3 | 0 | 0 | 2 | 4 | 16 | 2 | 0 | 0 | 0 |
| 4 | 2 | 8 | 2 | 0 | 0 | 4 | 16 | 4 | 0 |
| 5 | 0 | 2 | 8 | 2 | 0 | 2 | 8 | 2 | 0 |
| 6 | 0 | 0 | 0 | 8 | 2 | 1 | 4 | 1 | 0 |
| 7 | 0 | 0 | 0 | 2 | 8 | 1 | 2 | 0 | 0 |
| 8 | 0 | 4 | 0 | 0 | 0 | 0 | 4 | 16 | 4 |
| 9 | 0 | 0 | 4 | 0 | 0 | 0 | 2 | 8 | 2 |
| 10 | 0 | 0 | 1 | 4 | 1 | 0 | 1 | 4 | 1 |
| 11 | 0 | 0 | 0 | 2 | 4 | 0 | 0 | 4 | 0 |
| 12 | 0 | 0 | 1 | 0 | 0 | 0 | 2 | 4 | 16 |
| 13 | 0 | 0 | 0 | 1 | 0 | 0 | 1 | 2 | 8 |
| 14 | 0 | 0 | 1 | 2 | 1 | 0 | 0 | 1 | 4 |
| 15 | 0 | 0 | 0 | 1 | 2 | 0 | 0 | 1 | 2 |

*FIG. 10*

| Intra-prediction modes | ORIP | |
|---|---|---|
| | Luma | Chroma |
| DC | ON | OFF |
| SMOOTH | ON | ON |
| H_PRED/V_PRED mode with angle)delta == 0 | ON/OFF (signal) | ON |
| Other modes | OFF | OFF |

*FIG. 11*

```
static const int16_t dr_intra_derivative[90] = {
//            Approx angle
0,    0, 0,    //
2048, 0, 0,       // 3, ...
1024, 0, 0,       // 6, ...
512,  0, 0, 0, 0, // 9, ...
342,  0, 0,       // 14, ...
256,  0, 0,       // 17, ...
204,  0, 0,       // 20, ...
170,  0, 0,       // 23, ... (113 & 203 are base angles)
146,  0, 0,       // 26, ...
128,  0, 0,       // 29, ...
114,  0, 0, 0,    // 32, ...
102,  0, 0,       // 36, ...
86,   0, 0,       // 39, ...
74,   0, 0,       // 42, ...
64,   0, 0,       // 45, ... (45 & 135 are base angles)
56,   0, 0,       // 48, ...
48,   0, 0,       // 51, ...
40,   0, 0, 0,    // 54, ...
36,   0, 0,       // 58, ...
32,   0, 0,       // 61, ...
28,   0, 0,       // 64, ...
24,   0, 0,       // 67, ... (67 & 157 are base angles)
20,   0, 0,       // 70, ...
16,   0, 0,       // 73, ...
12,   0, 0, 0, 0, // 76, ...
8,    0, 0,       // 81, ...
4,    0, 0,       // 84, ...
2,    0, 0,       // 87, ...
};
```

FIG. 12

REFINED INTRA PREDICTION ANGLES

INCORPORATION BY REFERENCE

The present application claims the benefit of priority to U.S. Provisional Application No. 63/445,190, "Refined intra prediction angles" filed on Feb. 13, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives, from a coded video bitstream, coded information of a current coding block in a current picture. The coded information is indicative of a directional intra prediction of the current coding block. The processing circuitry determines an index to an entry in an angle-to-offset mapping lookup table according to the coded information of current coding block. The angle-to-offset mapping lookup table stores a set of derivative values that are associated with angles, the set of derivative values includes two or more integers that are powers of two. The processing circuitry accesses the entry in the angle-to-offset mapping lookup table according to the index to obtain a derivative value for the directional intra prediction of the current coding block, determines, for a pixel in the current coding block, an offset indicative of a reference location in the current picture according to the derivative value and a location of the pixel, and reconstructs the pixel in the current coding block based on the reference location in the current picture.

In some examples, the set of derivative values in the angle-to-offset mapping lookup table includes all integers that are powers of two between a minimum value in the set of derivative values and a maximum value in the set of derivative values. In an example, the set of derivative values are limited to N number of bits, and N is a positive integer, the set of derivative values comprise $2^i$, $i \in [1, 2 \ldots, N]$. In an example, the set of derivative values includes 2, 4, 8, 16, 32, 64, 128, 256, 512, 1024, and 2048. In some embodiments, when a derivative value of powers of 2 is used in a multiplication operation, the multiplication operation is performed using a shifting operation to reduce computation complexity.

In some examples, each difference of two adjacent derivative values in the set of derivative values is multiples of 2.

In some examples, the set of derivative values are associated with the angles that increase, differences between adjacent derivative values in the set of derivative values change in a monotonically manner.

In some examples, the set of derivative values includes a diagonal derivative value associated with 45° angle, and a derivative pair including a first derivative value and a second derivative value that are with a same absolute index difference to the diagonal derivative value, a product of the first derivative value and the second derivative value is within a range about a square of the diagonal derivative value. In an example, the square of the diagonal derivative value is one of 2048, 4096 and 8192. In an example, the product of the first derivative value and the second derivative value is within [T−d, T+d], T denotes the square of the diagonal derivative value, and d denotes a predefined range parameter.

According to some aspects of the disclosure, the processing circuitry receives, from a coded video bitstream, coded information of a current coding block in a current picture, the coded information is indicative of a specific nominal angle and a specific delta angle that collectively corresponds to a specific directional intra prediction angle in a first set of directional intra prediction angles, the first set of directional intra prediction angles includes predefined nominal angles and finer angles, the finer angles are away from the predefined nominal angles by delta angles. The processing circuitry determines that the current coding block is a non-square rectangle, and determines, in response to the current coding block being the non-square rectangle, a mapped intra prediction angle that is outside the first set of directional intra prediction angles and is mapped to the specific directional intra prediction angle. The processing circuitry reconstructs the current coding block based on the mapped intra prediction angle.

In some examples, the processing circuitry determines, in response to a height to width ratio or a width to height ratio being larger than a threshold, the mapped intra prediction angle from a mapped subset of directional intra prediction angles, the mapped subset of directional intra prediction angles are mapped from at least a nominal angle of 45° with the delta angles.

In some examples, the processing circuitry determines, in response to a height to width ratio of the current coding block being larger than 2, the mapped intra prediction angle from a mapped subset of directional intra prediction angles, the mapped subset of directional intra prediction angles are greater than 203° and are mapped from a first nominal angle of 45° with the delta angles, and a second nominal angle of 67° with the delta angles.

In some examples, the processing circuitry determines, in response to a width to height ratio of the current coding block being larger than 2, the mapped intra prediction angle from a mapped subset of directional intra prediction angles, the mapped subset of directional intra prediction angles are smaller than 45° and are mapped from a nominal angle of 203° with the delta angles.

In some examples, the processing circuitry determines, in response to a height to width ratio of the current coding block being equal to 2, the mapped intra prediction angle from a mapped subset of directional intra prediction angles, the mapped subset of directional intra prediction angles are greater than 203° and are mapped from a nominal angle of 45° with the delta angles.

In some examples, the processing circuitry determines, in response to a height to width ratio of the current coding block being greater than a threshold, the mapped intra prediction angle from a mapped subset of directional intra prediction angles, the mapped subset of directional intra prediction angles are mapped from a nominal angle with a subset of the delta angles at a side of the nominal angle.

In some examples, the processing circuitry determines, from an above side and a left side, a first side and a second side, the first side having more intra coded neighboring blocks than the second side, and maps one or more directional intra prediction angle from the second side to the first side.

In some examples, the processing circuitry determines a reference line index, and determines, in response to the reference line index being greater than zero and the current coding block being the non-square rectangle, the mapped intra prediction angle that is outside the first set of directional intra prediction angles and is mapped to the specific directional intra prediction angle.

In some examples, the processing circuitry determines that a syntax element is indicative of an enabling of angle mapping and determines, in response to the syntax element being indicative of the enabling of angle mapping and the current coding block being the non-square rectangle, the mapped intra prediction angle that is outside the first set of directional intra prediction angles and is mapped to the specific directional intra prediction angle. The syntax element is at least of a sequence level, a frame level, a slice level and a super block level.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 5 shows an example of a lookup table in some embodiments.

FIG. 10 shows a table of predefined weights for offset computation in some examples.

FIG. 11 shows a table of mode dependent ON/OFF of the sub-block based offset based refinement for intra prediction in some examples.

FIG. 12 shows an example of a lookup table in some embodiments.

DETAILED DESCRIPTION OF EMBODIMENTS

Figure 1:
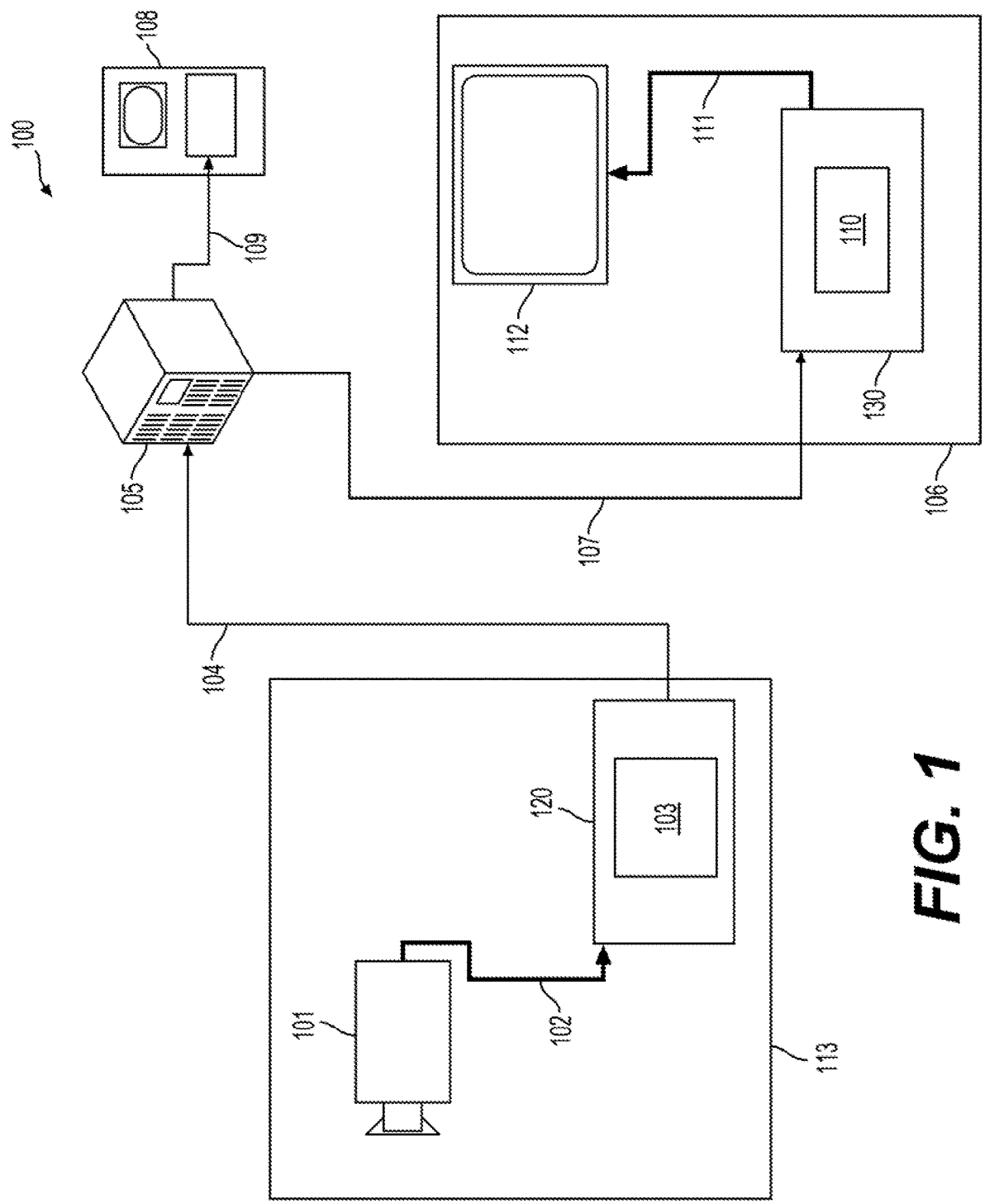
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
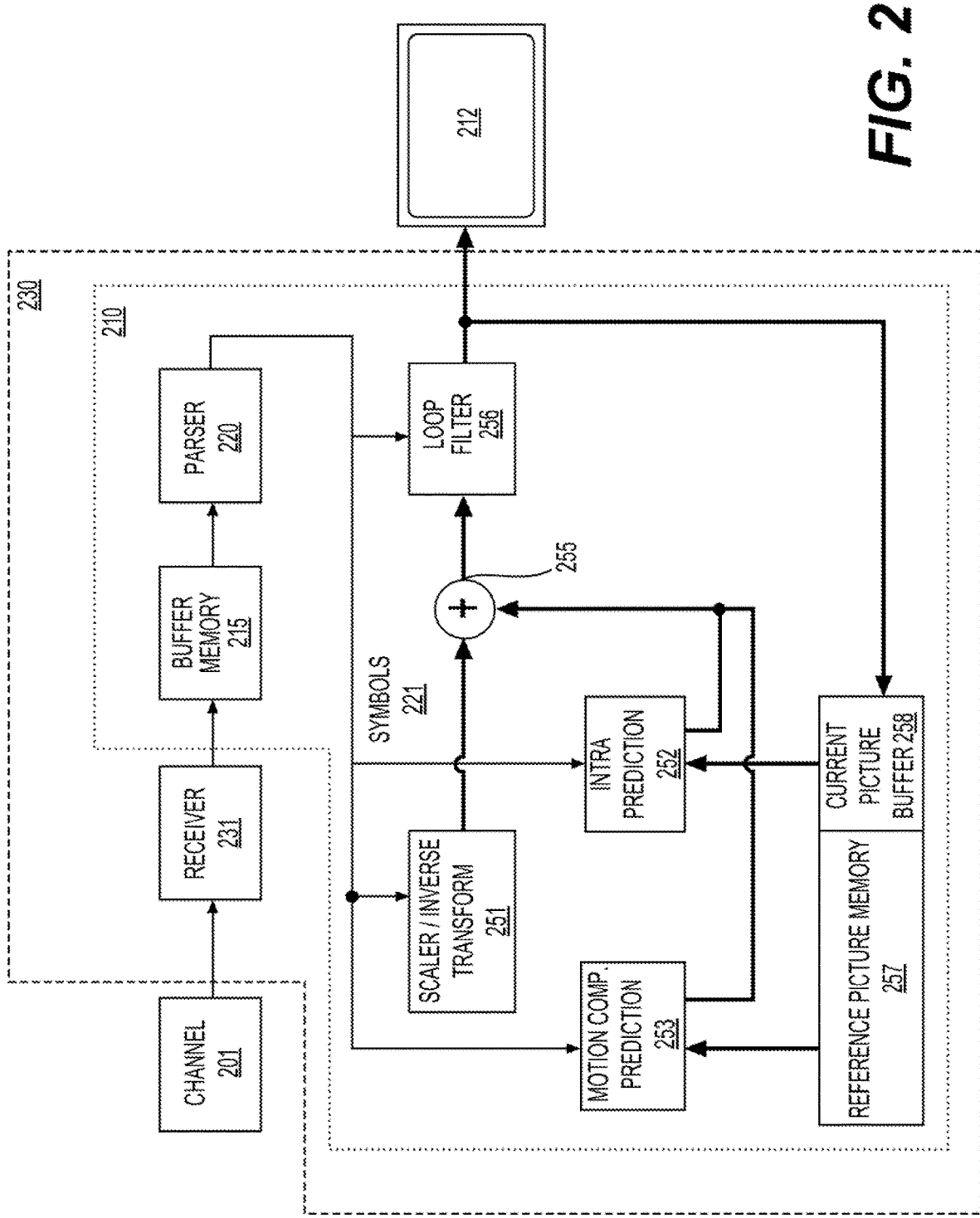
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
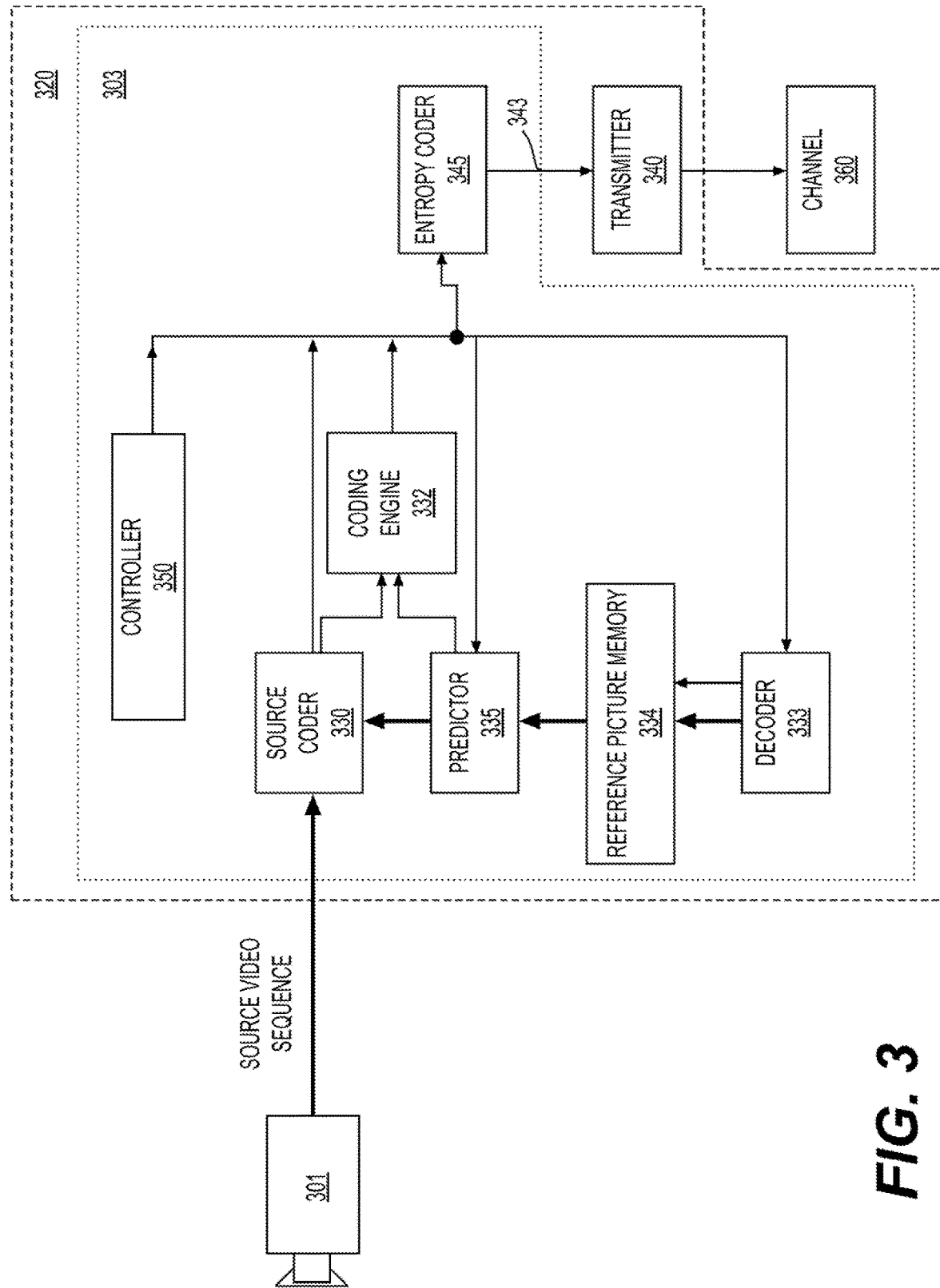
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for refining intra prediction angles.

Various video processing standards, such as High Efficiency Video Coding (HEVC), Versatile Video Coding (VVC), AOMedia Video 1 (AV1), and the like have been developed for image and/or video processing, such as storage, transmission, compression, reconstruction, and the like. Additional video coding techniques can be further developed to provide improved coding performance.

According to an aspect of the disclosure, AV1 includes techniques of directional intra prediction and non-directional smooth intra prediction. For directional intra prediction, AV1 provides 8 nominal angles (also referred to as base angles in some examples) that are named as V_PRED, H_PRED, D45_PRED, D135_PRED, D113_PRED, D157_PRED, D203_PRED, and D67_PRED.

Figure 4:
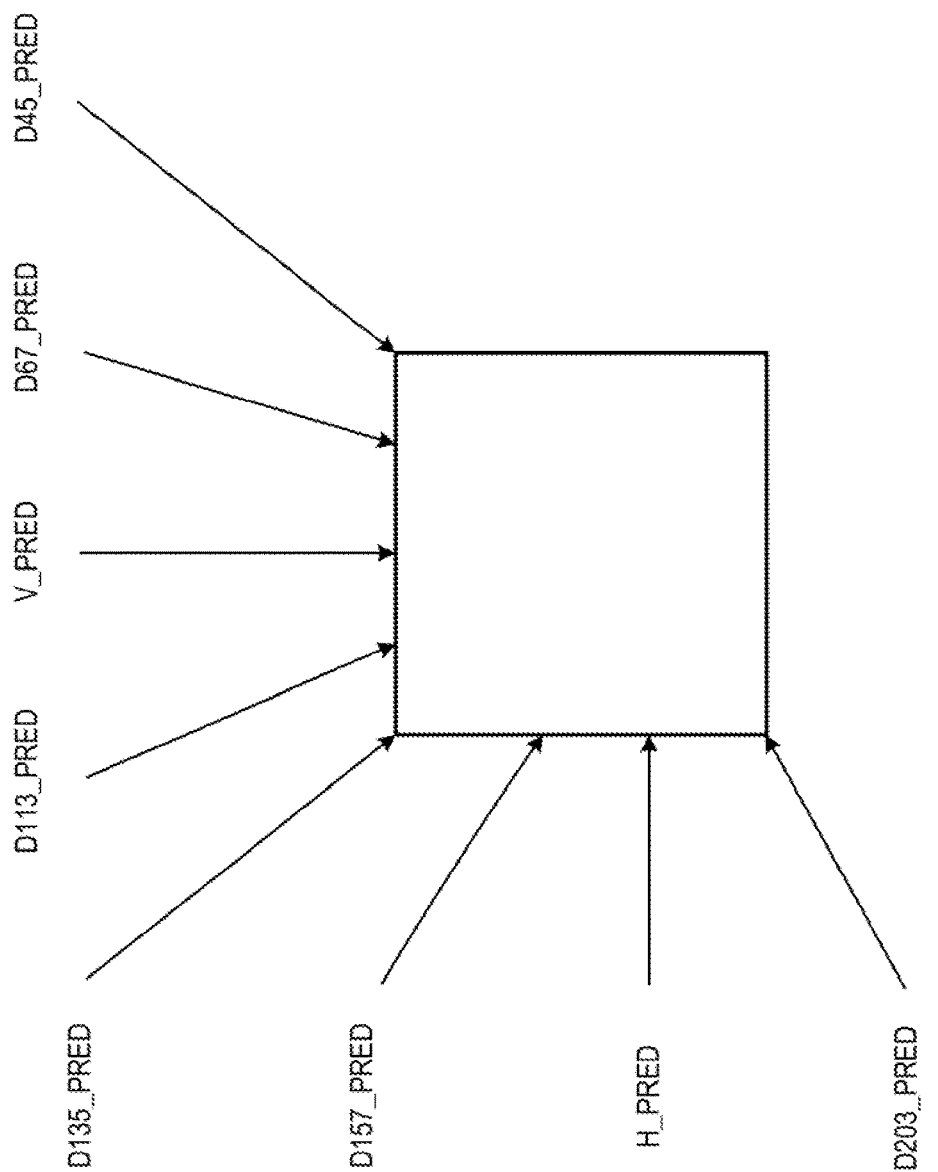
FIG. 4 shows a diagram illustrating 8 nominal angles in some examples.

FIG. 4 shows a diagram illustrating 8 nominal angles in AV1. Among the 8 nominal angles, D45_PRED represents a directional intra prediction with 45° to positive X direction, D67_PRED represents a directional intra prediction with 67° to positive X direction, V_PRED represents a directional intra prediction with 90° (vertical) to positive X direction, D113_PRED represents a directional intra prediction with 113° to the positive X direction, D135_PRED represents a directional intra prediction with 135° to the positive X direction, D157_PRED represents a directional intra prediction with 157° to the positive X direction, H_PRED represents a directional intra prediction with 180° to the positive X direction, and D203_PRED represents a directional intra prediction with 203° to the positive X direction.

Further, to exploit more varieties of spatial redundancy in directional textures, AV1 includes directional intra modes that are extended to an angle set with finer granularity. In some examples, for each nominal angle, an angle set of 7 angles with finer granularity is used. Thus, AV1 has 56 directional angles (also referred to as prediction angles or intra prediction angles) in total. In an example, a prediction angle is presented by a combination of a nominal angle and a delta angle, the delta angle is multiples of a step size. For example, the step size is 3, and the delta angle can be one of −9°, −6° −3°, 0, 3°, 6° and 9°. For example, for the nominal angle of D45_PRED, the angle set can include prediction angles of 36°, 39°, 42°, 45°, 48°, 51° and 54° degrees. AV1 includes 56 directional intra prediction modes respectively corresponding to the 56 directional angles. In some examples, to implement the directional prediction modes in AV1, for a directional prediction mode (corresponding to a directional angle), a unified directional predictor projects each pixel in a current block to a reference sub-pixel location according to the prediction angle and interpolates the reference pixel by a 2-tap bilinear filter.

According to an aspect of the disclosure, tangent or cotangent functions (also referred to as derivative) can be used to project pixels in the current block to reference locations according to the intra prediction angle. For example, a horizontal offset between a pixel and a reference location (e.g., sub-pixel location) can be determined by a cotangent function of an intra prediction angle and a vertical location of the pixel; or a vertical offset between a pixel and a reference location (e.g., sub-pixel location) can be determined by a tangent function of an intra prediction angle and a horizontal location of the pixel. The tangent or cotangent functions can be implemented by pre-calculations to reduce computation. In some examples, a look-up table can include the pre-calculated values of the tangent or cotangent functions and is then used to map the each intra prediction angle to the horizontal and vertical offsets between each pixel in current block and the reference locations.

FIG. 5 shows an example of pseudo code (500) for a lookup table in some embodiments. In the FIG. 5 example, the lookup table includes a plurality of values associated with angles within [0, 90°]. For example, the lookup table includes 90 values associated with integer angles from 0° to 89°. A non-zero value associated with an angle corresponds to an integer value of cotangent of the corresponding angle multiplied by 64. For example, cotangent (45°) multiplied by 64 is equal to 64, cotangent(23°) multiplied by 64 is about 151 in integer. A non-zero value associated with an angle is also referred to as a derivative value associated with the angle. In the FIG. 5 example, when a derivative value associated with an angle is zero, the angle is not in the angle set for directional intra prediction. For example, the first row includes three zeros associated with 0°, 1° and 2°, thus 0°, 1° and 2° are not in the angle set for directional intra prediction. The second row includes 2048 associated with 3°, 0 associated with 4° and 0 associated with 5°, thus 4° and 5° are not in the angle set for directional intra prediction.

Using the lookup table in FIG. 5, the vertical offset or horizontal offset of each pixel in the current block to the reference location can be calculated. For example, when the intra prediction angle is 113°, a horizontal offset between a first pixel and a reference location (e.g., above reference location) can be determined by the derivative value associated with 67° and the vertical location of the first pixel; or a vertical offset between a second pixel and a reference location (e.g., left reference location) can be determined by the derivative value associated with 23° and the horizontal location of the second pixel.

It is noted that the derivative values in the FIG. 5 are offsets for each pixel unit (per pixel unit). In an example, the derivative value associated with 45° is 64, which indicates the horizontal offset value between each pixel in current block and reference location is increased by 1 pixel as the row number of the pixel increases by 1 in an example. In some examples, the lookup table in FIG. 5 is also referred to as angle-to-offset lookup table or angle-to-offset mapping table or angle-to-offset mapping lookup table.

AV1 uses 5 non-directional smooth intra prediction modes that are referred by DC (prediction or mode), PAETH (prediction or mode), SMOOTH (prediction or mode), SMOOTH_V (prediction or mode), and SMOOTH_H (prediction or mode).

Figure 6:
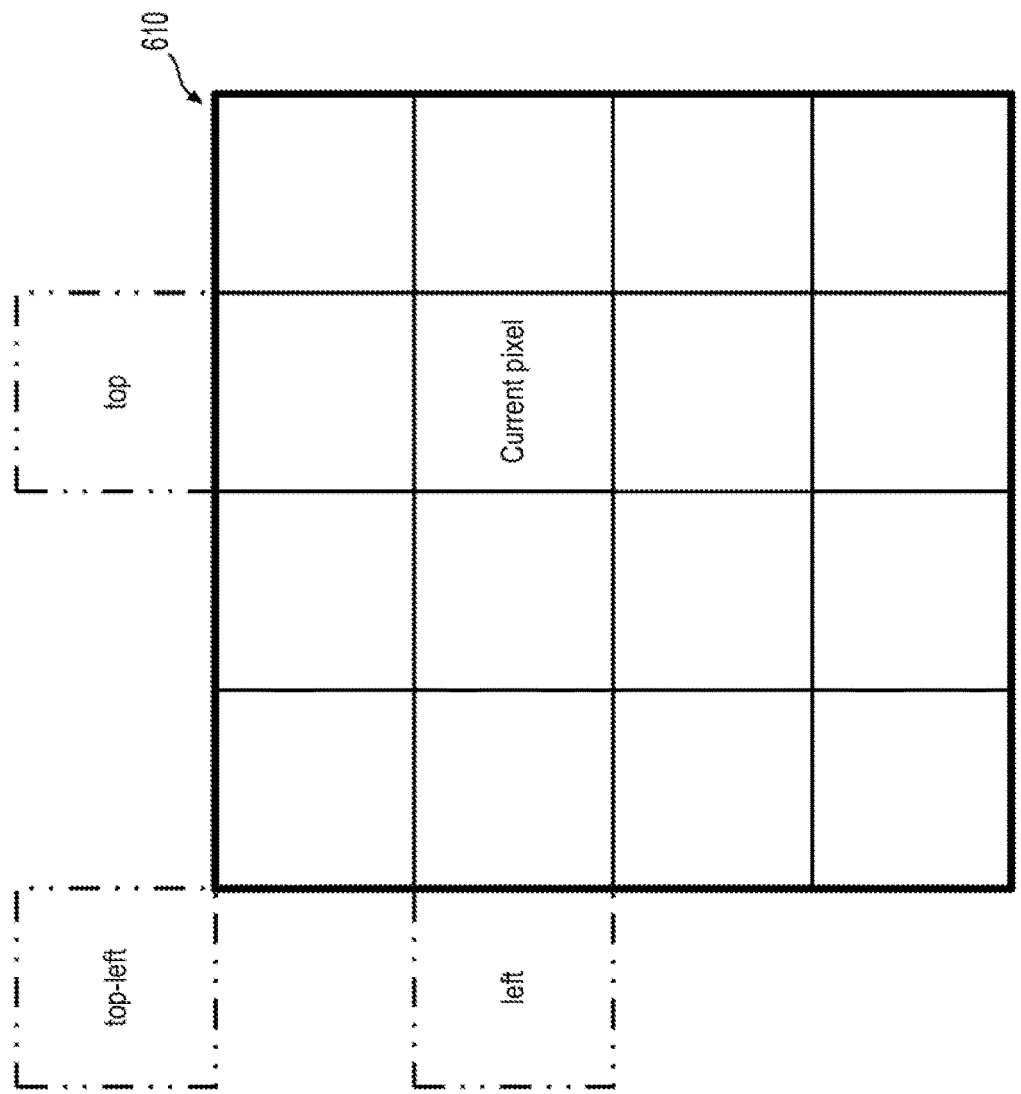
FIG. 6 shows a diagram of a current block for illustrating non directional smooth intra prediction modes in some examples.

FIG. 6 shows a diagram of a current block (610) for illustrating non directional smooth intra prediction modes in some examples. For a current pixel (shown as current pixel in FIG. 6) in the current block (610), a top neighboring sample (shown by top) is a pixel in the above reference line (above row) to the current block (610), a left neighboring sample (shown by left) is a pixel in the left reference line (left column) to the current block (610), and a top-left neighboring sample (shown by top-left) is a pixel to the top left corner of the current block (610). The top neighboring sample has the same horizontal location as the current pixel, the left neighboring sample has the same vertical location as the current pixel, the top-left neighboring sample has the same horizontal location as the left neighboring sample and has the same vertical location as the top neighboring sample.

For DC prediction, the average of left and above neighboring samples is used as the predictor of the current block. For PAETH prediction, top, left and top-left neighboring samples (also referred to as reference samples) are firstly fetched, and then the value which is closest to (top+left−(top−left)) is set as the predictor for the current pixel to be predicted. For SMOOTH_V mode, quadratic interpolations in vertical direction are used to predict the current block. For SMOOTH_H mode, quadratic interpolations in horizontal direction are used to predict the current block. For SMOOTH mode, the average of quadratic interpolations of both vertical and horizontal directions are used to predict the current block.

According to an aspect of disclosure, a technique referred to as recursive-filtering-based intra predictor can be used to capture decaying spatial correlation. In some examples, to capture decaying spatial correlation with references on the edges, modes referred to as filter intra modes are designed for luma blocks. In some examples, AV1 includes five filter intra modes, each of the five filter intra modes is represented by a set of eight 7-tap filters reflecting correlation between pixels in a 4×2 patch and 7 neighbors adjacent to the patch. In other words, the weighting factors for 7-tap filter are position dependent.

Figure 7:
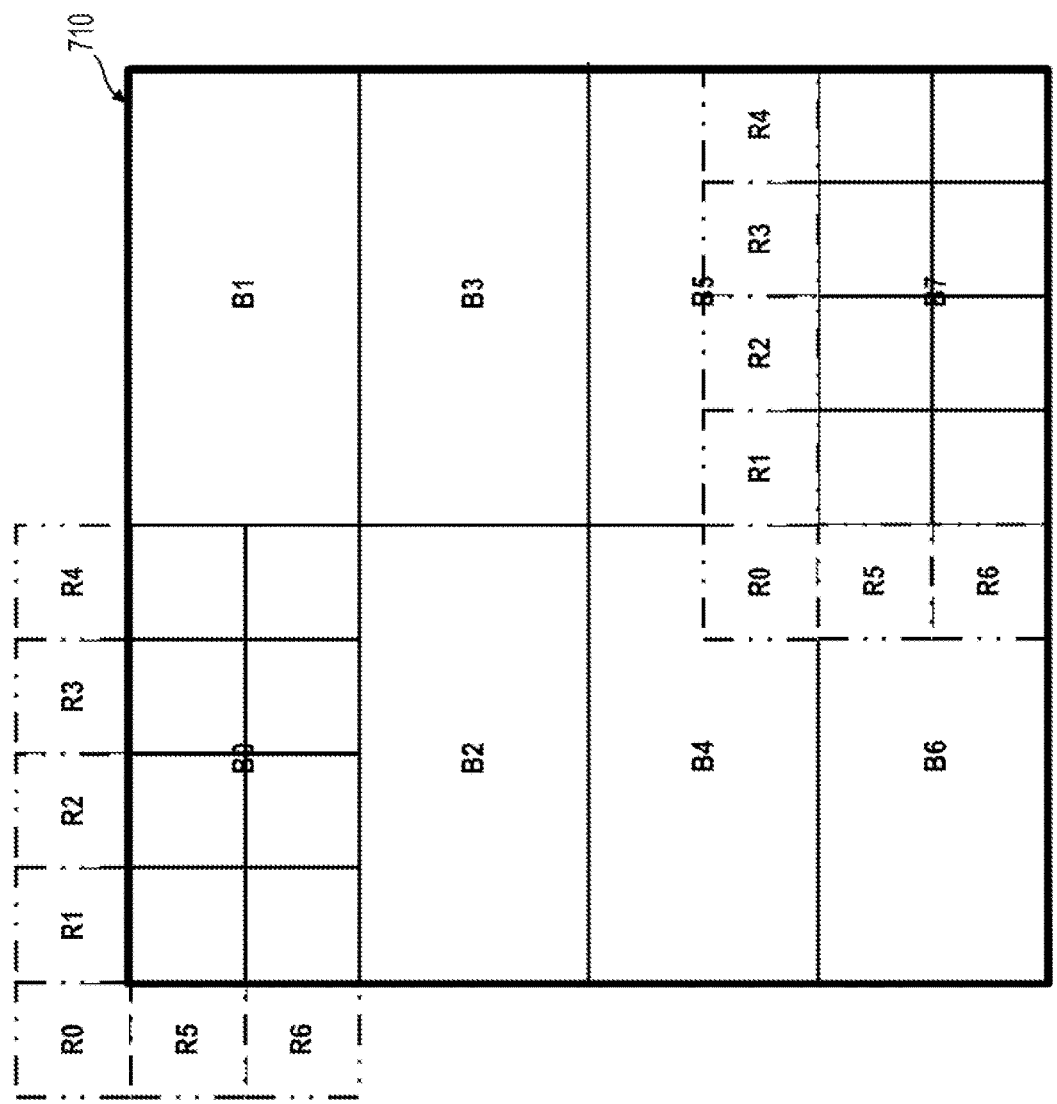
FIG. 7 shows a diagram for of a current block illustrating recursive filtering based intra prediction in some examples.

FIG. 7 shows a diagram for of a current block (710) illustrating recursive filtering based intra prediction in some examples. For example, the current block (710) is an 8×8 block and can be split into eight 4×2 patches that are shown by B0, B1, B2, B3, B4, B5, B6, and B7 in FIG. 7. Each patch can have neighbor samples, such as 7 above and left neighbor samples indicated by R0-R6. The neighbor samples of a patch are used to predict the pixels in the patch. For example, for patch B0, the above and left neighbor samples are already reconstructed, and the patch B0 can be predicted based on the above and left neighbor samples. But for other patches, not all of the above and left neighbor samples are reconstructed. In an example, the predicted values of immediate neighbors can be used as the reference. For example, the above and left neighbor samples of patch B7 are not reconstructed, the prediction values of neighbor samples (e.g., in the patches B5 and B6) can be used instead. In an example, the patches are predicted in an order, such as in an order of B0, B1, B2, B3, B4, B5, B6, and B7.

In some examples, chroma samples can be predicted from luma samples, and the prediction technique is referred to as chroma from luma (CfL) prediction. CfL prediction is a chroma-only intra predictor that models chroma pixels as a linear function of coincident reconstructed luma pixels. For example, the CfL prediction is expressed as in Eq. (1):

$$CfL(\alpha) = \alpha \times L_{AC} + DC \qquad \text{Eq. (1)}$$

wherein $L_{AC}$ denotes the AC contribution of luma component, $\alpha$ denotes the parameter of the linear model, and DC denotes the DC contribution of the chroma component. In some examples, the reconstructed luma pixels are sub-sampled into the chroma resolution, and then the average value is subtracted to form the AC contribution. To approximate chroma AC component from the AC contribution, instead of requiring the decoder to calculate the scaling parameters, in some examples, the parameter $\alpha$ can be determined based on the original chroma pixels at the encoder side and the parameter $\alpha$ can be signaled in the bitstream. Determining the parameter $\alpha$ at the encoder side can reduce decoder complexity and yield more precise predictions. In some examples, the DC contribution of the chroma component can be computed using intra DC mode, which is sufficient for most chroma content and has fast implementations.

In AV1, the total number of available intra prediction modes is 62, which includes 56 directional intra prediction modes, 5 non-directional modes, and one chroma from luma mode (only for chroma component). In some examples, to signal the intra prediction modes, a first syntax is signaled to indicate a nominal mode of the current block, the nominal mode can indicate a nominal angle for directional intra prediction mode or can be a non-directional mode. Then, when the intra prediction mode of current block is a directional intra prediction mode, a second syntax is signaled to indicate which delta angle is used for current block. In some examples, a correlation between the intra prediction mode of current block and its neighboring blocks can be used to improve coding efficiency. For example, the available intra prediction modes for current block can be split into a plurality of intra prediction mode sets according to the intra prediction modes of neighboring blocks. To get the intra prediction mode of current block, a mode set index is signaled first to indicate the mode set index of the intra prediction modes for current block, then a mode index is signaled secondly to indicate the index of intra prediction mode within the mode set.

In some examples, an intra prediction technique that is referred to as offset based refinement for intra prediction (ORIP) can be used.

Figure 8:
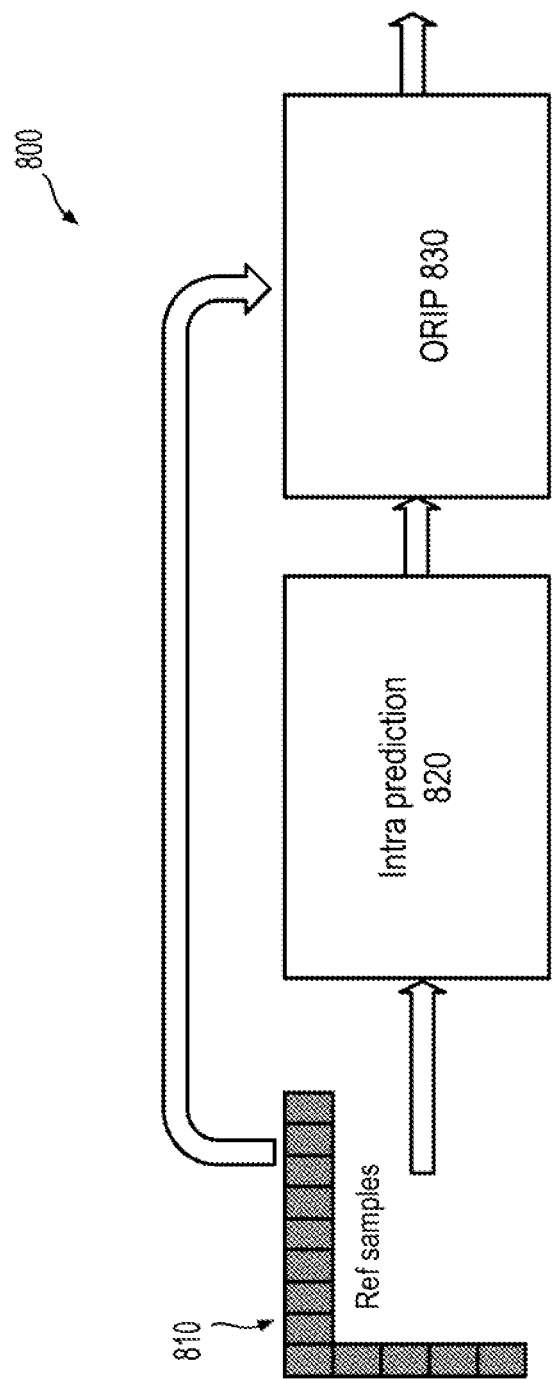
FIG. 8 shows a diagram illustrating a modified intra prediction module with offset based refinement for intra prediction in some examples.

FIG. 8 shows a diagram illustrating a modified intra prediction module (800) with offset based refinement for intra prediction in some examples. The modified intra prediction module (800) includes an intra prediction sub module (820) and an offset based refinement for intra prediction (ORIP) sub module (830). The intra prediction sub module (820) can perform any suitable intra prediction for a current block based on neighboring reference samples (810) of the current block to generate intra prediction samples. After generating the intra prediction samples, the ORIP sub module (830) can generate offset values based on the neighboring reference samples (810) and add the offset values to the intra prediction samples for refinement.

In some examples, the refinement is performed in 4×4 sub-block level. For each 4×4 subblock, the offsets are generated from above and left neighboring samples of that sub-blocks.

Figure 9:
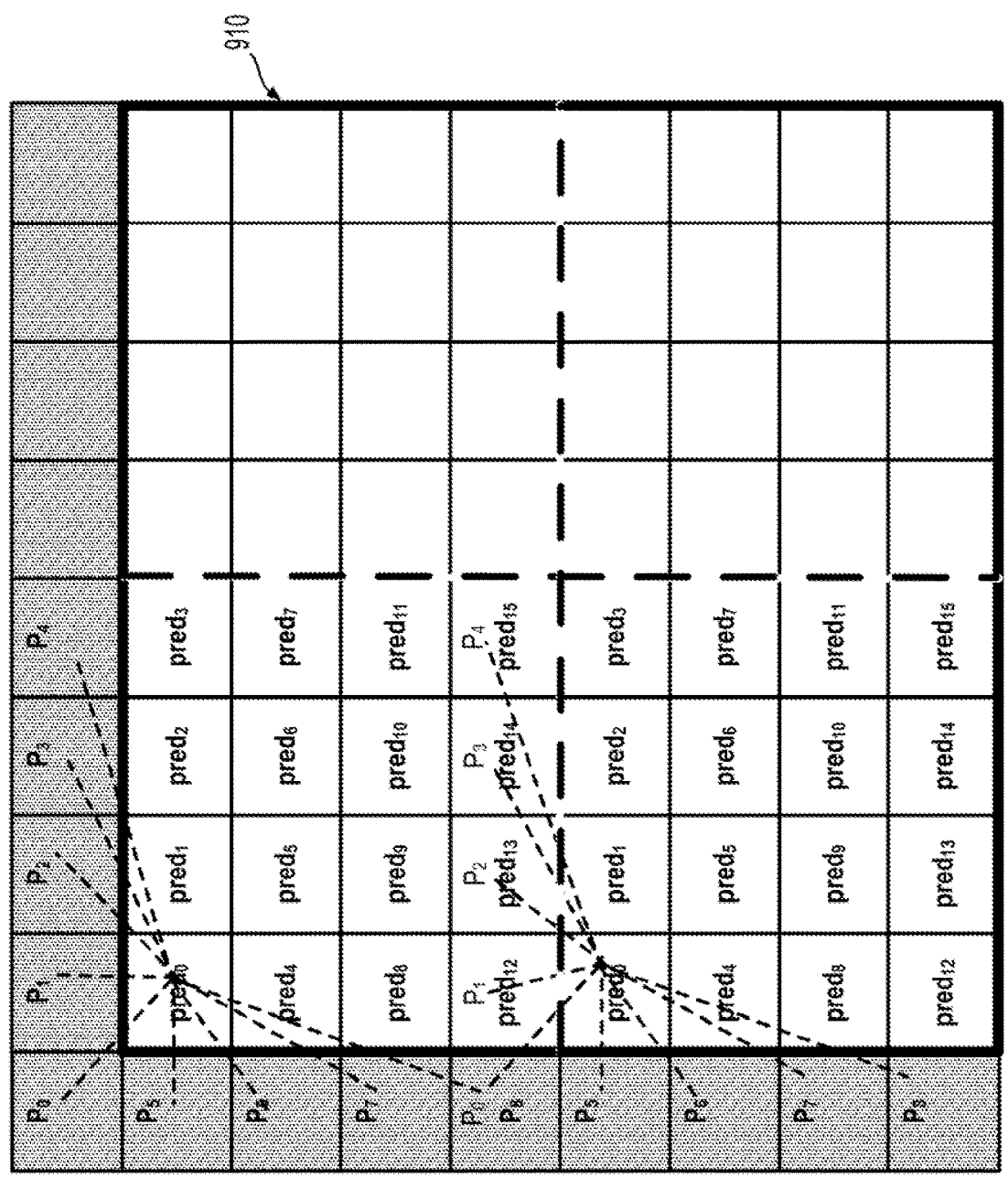
FIG. 9 shows a diagram illustrating sub-block based offset based refinement for intra prediction in some examples.

FIG. 9 shows a diagram illustrating sub-block based ORIP in some example. In the FIG. 9 example, a current coding block (910) is an 8×8 block and is divided into four 4×4 subblocks as shown by a vertical dashed line and a horizontal dashed line. For a 4×4 subblock, the above and left neighboring samples of the 4×4 subblock are shown by $P_0$ to $P_8$. It is noted that the above and left neighboring samples of a 4×4 subblock can be reconstructed samples of other coding blocks, or can be predicted samples of other subblocks in the current coding block (910) before refinement.

In some examples, for each of the 16 pixels in a 4×4 subblock, the offset value is calculated based on a combination of the above and left neighboring samples with different weights. In an example, the offset value of k-th position of a 4×4 sub-block is generated according to Eq. (2), and the refined intra prediction sample value pred_refined$_k$ can be calculated according to Eq. (3):

$$\text{offset}(k) = \left(\sum_{n=0}^{8} W_{kn} * \{P_n - pred_k\} + 32\right) >> 6 \quad \text{Eq. (2)}$$

$$\text{pred\_refined}_k = clip3(pred_k + \text{offset}(k)) \quad \text{Eq. (3)}$$

where pred$_k$ denotes the intra prediction sample value of the pixel at k-th position before the refinement, $P_n$ denotes n-th neighboring sample, such as $P_0$ to $P_8$, and $W_{kn}$ denotes weight for the n-th neighboring sample for calculating the offset value of k-th position.

FIG. 10 shows a table of predefined weights for offset computation in some examples.

In some examples, the sub-block based ORIP is applied only to a predefined set of intra-prediction modes and differently for luma and chroma depending on the mode.

FIG. 11 shows a table of mode dependent ON/OFF of the sub-block based ORIP in some examples. In an example, when the intra prediction mode is either DC or SMOOTH, the ORIP is always ON and no additional signaling is required. However, when the intra prediction mode is H_PRED/V_PRED with angle_delta being equal to 0, a block level signaling is required to enable/disable of the ORIP.

According to an aspect of the disclosure, in the related examples, the intra prediction angles is almost evenly distributed in a range determined based on two nominal angles (e.g., 45° to 203°) and the delta angles, such as from 36° degrees to 212°, which may be suboptimal.

According to another aspect of the disclosure, in the related examples, the same range of intra prediction angles are applied to blocks with different shapes, such as square block and non-square rectangular block, which may be suboptimal.

According to some aspect of the disclosure, the difference between adjacent non-zero derivative values is monotonically decreasing as the intra prediction angle increases in an angle-to-offset lookup table (also referred to as angle-to-offset mapping table).

According to an aspect of the disclosure, the derivative values in an angle-to-offset lookup table can affect computation complexity. The derivative values in the angle-to-offset lookup table can be suitable adjusted to reduce computation complexity.

In some embodiments, when the minimum difference between adjacent non-zero derivative values is denoted as min_diff, then all the difference between any adjacent non-zero derivative values is restricted to be multiples of min_diff. For example, when min_diff is equal to 2, then the difference between any adjacent non-zero derivative values need to be multiples of 2, such as 2, 4, 6, 8, 10, 12 and the like.

In some embodiments, when the derivative values in the angle-to-offset lookup table is from M to N (M<N), and M and N are both positive integers, M denotes the minimum value of the derivative values and N denotes the maximum value of the derivative values in the angle-to-offset lookup table, then all the powers of 2 values between M and N are included in the angle-to-offset lookup table. Thus, when a derivative value of powers of 2 is used to calculate offset, to calculate the offset by multiplication operations of the derivative value with position parameter of a pixel, the multiplication operations can be performed by shifting operations. Thus, when the set of derivative values include two or more values of powers of 2, computation complexity is reduced. It is noted that the angle associated with the derivative value can be suitable determined based on an arctangent function or arc cotangent function.

FIG. 12 shows an example of pseudo code (1200) for a lookup table (angle-to-offset lookup table) in some embodiments. In the FIG. 12 example, the lookup table includes a plurality of values associated with angles within [0, 90°]. For example, the lookup table includes 90 derivative values associated with 90 angles in an increasing order. The non-zero derivative values are in a decreasing order. It is noted that the non-zero derivative values may not correspond to integer angles. The exact values of the angles for the non-zero derivative values can be calculated by an arctangent function or arc cotangent function. Comparing FIG. 12 with FIG. 5, the lookup table in FIG. 12 includes all values of the powers of two, such as 2, 4, 8, 16, 32, 64, 128, 256, 512, 1024, 2048, between 0 to 2048. Using FIG. 12 can reduce computation complexity compared to the lookup table in FIG. 5.

In some embodiments, the product of a pair of derivative values in the lookup table (also referred to as angle-to-offset mapping table), which are associated with equal prediction mode index to the 45° angle, is within a small range specified by a fixed value [T−d, T+d]. In one example, T is 2048, 4096, 8192, d is 0, 1, 2, 3, 4, 5, . . . , 32, . . . 64, . . . . For example, the derivative value associated with 45° is also referred to as diagonal derivative value, and has a value of 64 at index 45 in the lookup table of FIG. 12, the value of T is a square of 64 and is equal to 4096. For a derivative pair that includes a first derivative value at a first index and a second derivative value at a second index in the lookup table of FIG. 12, the sum of the first index and the second index is 90. The first derivative value and the second derivative value can be suitably adjusted, such that the product of the first derivative value and the second derivative value is restricted in the range [T−d, T+d]. The adjustment of the derivative values for the lookup table can reduce computation complexity and keep the resolution in a certain range.

According to some aspects of disclosure, when the shape of a block is not square, one side (or both sides) of the delta angles of one (or more) nominal angle(s) and/or the nominal angle itself maybe mapped to another angle(s) for performing intra prediction.

In some embodiments, when the width/height ratio or height/width ratio is greater than one threshold, then one or more nominal angles together with all of its/their delta angles are mapped to another angle(s) for intra prediction.

In some examples, when the height/width ratio is greater than 2, the nominal angles D45_PRED and D67_PRED together with their delta angles (e.g., 45°, 45°±3°, 45°±6°, 45°±9°, 67°, 67°−3°, 67°−6°, 67°−9°) are mapped to other angles for intra prediction. For example, the mapped angles are greater than 203°, such as greater than 212°.

In some examples, when the width/width ratio is greater than 2, the nominal angle D203_PRED together with delta angles (e.g., 203°, 203°+3°, 203°+6°, 203°+9°) are mapped to other angles for intra prediction. For example, the mapped angles are less than 45°, such as less than 36°.

In some examples, when the height/width ratio is 2, then the nominal angle D45_PRED together with their delta angles (e.g., 45°, 45°±3°, 45°±6°, 45°±9°) are mapped to other angles for intra prediction. For example, the mapped angles are greater than 203°, such as greater than 212°.

In some embodiments, one side of the delta angles of one nominal angle and/or the nominal angle itself can be mapped to another angle(s) for performing intra prediction when the shape of the block is not square.

In some examples, when the width/height ratio is greater than 2, such as 4, all the positive delta angles for D203_PRED nominal angle (e.g., 203°+3°, 203°+6°, 203°+9°) is mapped to other angles that are less than 45°, such as less than 36°.

In some embodiments, one side of the delta angles of one nominal angle and/or the nominal angle itself can be mapped to other angles in the other side of the current block for performing intra prediction if the neighboring intra blocks are more in that side. In some examples, angles smaller than 135°, such as the nominal angles D113_PRED, V_PRED, D67_PRED, and the D45_PRED and associated finer angles based on the delta angles, can be referred to as above directional angles, and angles larger than 135°, such as the nominal angles D157_PRED, H_PRED, and D203_PRED and associated finer angles based on the delta angles, can be referred to as left directional angles.

In some examples, when the above neighboring blocks of current block have more intra coded blocks than the left neighboring blocks of the current block, some of the left directional angles are mapped to the above directional angles. In some examples, when the left neighboring blocks of current block have more intra coded blocks than the above neighboring blocks of the current block, some of the above directional angles are mapped to the left directional angles.

In some examples, when the above neighboring blocks of the current block have more directional (angular) intra coded blocks than the left neighboring blocks of the current block, some of the left directional angles are mapped to the above directional angle. In some examples, when the left neighboring blocks of the current block have more directional (angular) intra coded blocks than the above neighboring blocks of the current block, some of the above directional angles are mapped to the left directional angles.

In some embodiments, one or multiple nominal angle(s) together with its/their delta angles maybe mapped to other angles for performing intra prediction when the shape of the block is not square and reference line index for intra prediction is greater than zero (e.g., non zero reference line).

In some embodiments, one high level syntax is signaled in sequence/frame/slice/super block/level to indicate whether the angle mapping can be applied or not for non-square blocks.

Figure 13:
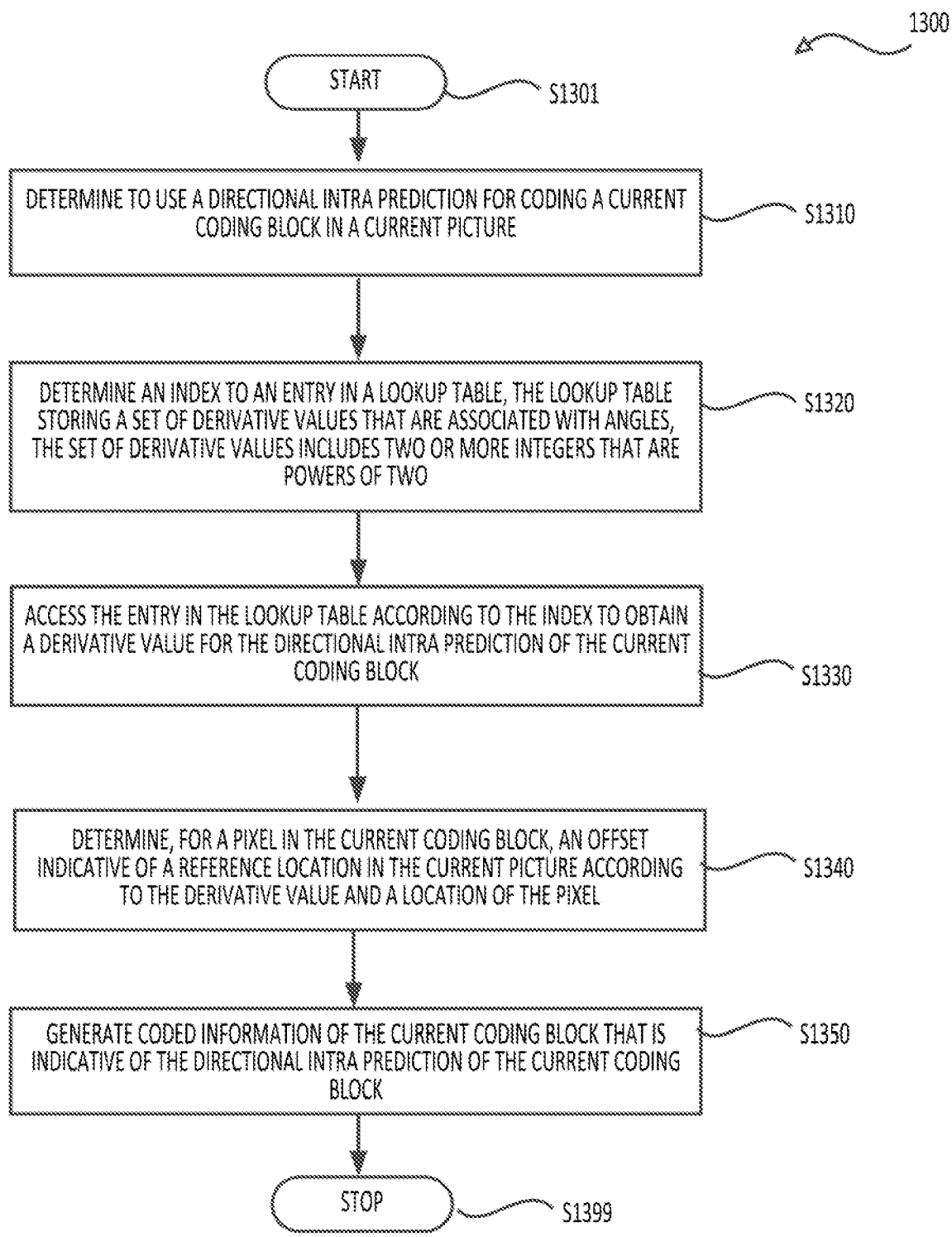
FIG. 13 shows a flow chart outlining a process according to some embodiment of the disclosure.

FIG. 13 shows a flow chart outlining a process (1300) according to an embodiment of the disclosure. The process (1300) can be used in a video encoder. In various embodiments, the process (1300) is executed by processing circuitry, such as the processing circuitry that performs functions of the video encoder (103), the processing circuitry that performs functions of the video encoder (303), and the like. In some embodiments, the process (1300) is implemented in software instructions, thus when the processing circuitry executes the software instructions, the processing circuitry performs the process (1300). The process starts at (S1301) and proceeds to (S1310).

At (S1310), a use of a directional intra prediction for coding a current coding block in a current picture is determined.

At (S1320), an index to an entry in a lookup table (e.g., angle-to-offset mapping lookup table) is determined, the lookup table stores a set of derivative values that are associated with angles, the set of derivative values including two or more integers that are powers of two.

At (S1330), the entry in the lookup table is accessed according to the index to obtain a derivative value for the directional intra prediction of the current coding block.

At (S1340), for a pixel in the current coding block, an offset indicative of a reference location in the current picture is determined according to the derivative value and a location of the pixel. The reference location in the current picture is used for the directional intra prediction of the pixel.

At (S1350), coded information of the current coding block that is indicative of the directional intra prediction of the current coding block is generated.

In some examples, the set of derivative values in the lookup table includes all integers that are powers of two between a minimum value in the set of derivative values and a maximum value in the set of derivative values. In an example, the set of derivative values are limited to N number of bits, and N is a positive integer, the set of derivative values includes $2^i$, $i \in [1, 2 \ldots, N]$.

In some examples, each difference of two adjacent derivative values in the set of derivative values is multiples of 2.

In some examples, the set of derivative values are associated with the angles that increase, differences between adjacent derivative values in the set of derivative values change in a monotonically manner, such as monotonically decrease.

In some examples, the set of derivative values includes a diagonal derivative value associated with 45° angle, and a derivative pair including a first derivative value and a second derivative value that are at different sides of the 45° angle and with a same absolute index difference to the diagonal derivative value, a product of the first derivative value and the second derivative value is within a range about a square of the diagonal derivative value. In an example, the square of the diagonal derivative value is one of 2048, 4096 and 8192. In some examples, the product of the first derivative value and the second derivative value is within [T−d, T+d], T denotes the square of the diagonal derivative value, and d denotes a predefined range parameter.

Then, the process proceeds to (S1399) and terminates.

The process (1300) can be suitably adapted. Step(s) in the process (1300) can be modified and/or omitted. Additional step(s) can be added. Any suitable order of implementation can be used.

Figure 14:
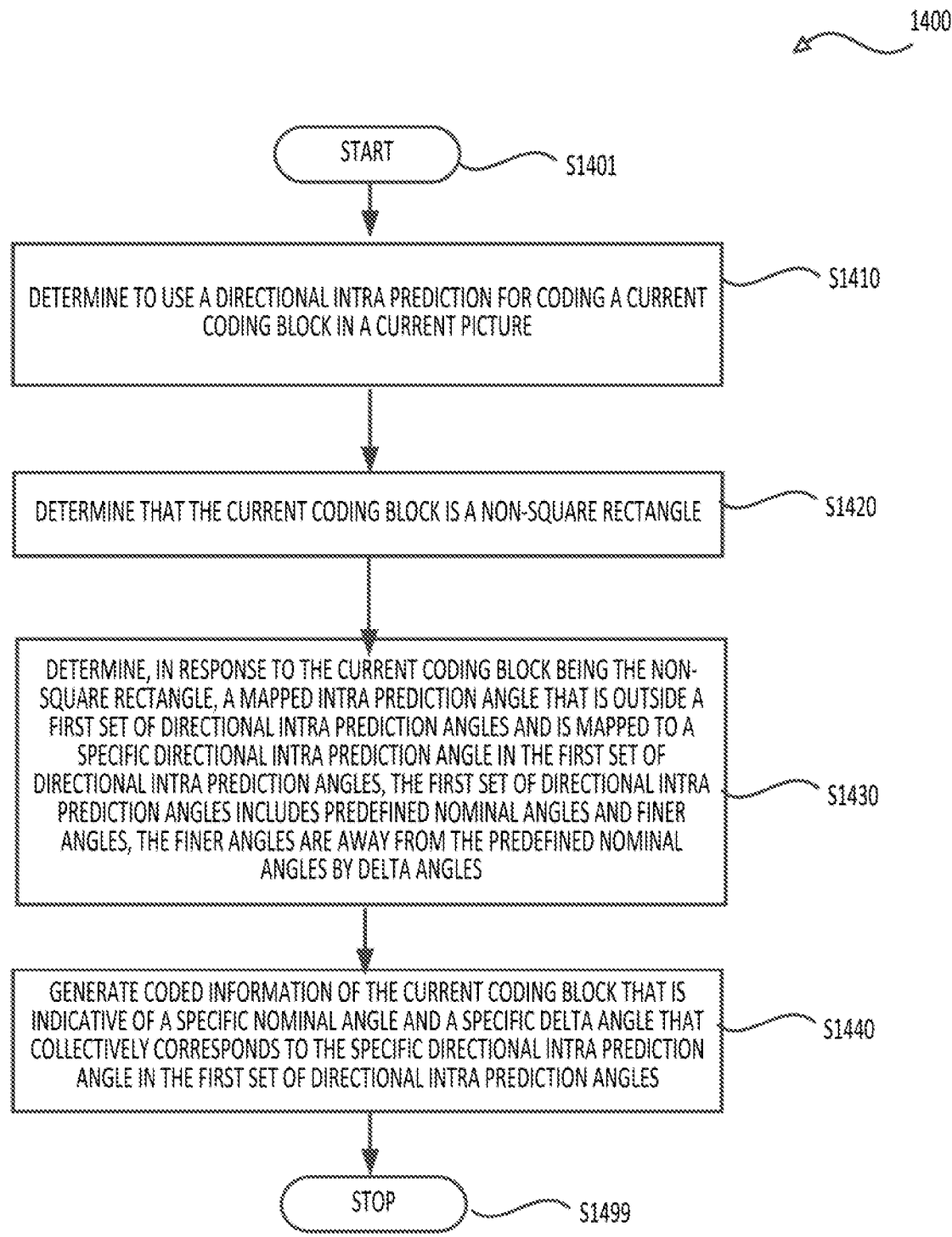
FIG. 14 shows a flow chart outlining a process according to some embodiment of the disclosure.

FIG. 14 shows a flow chart outlining a process (1400) according to an embodiment of the disclosure. The process (1400) can be used in a video encoder. In various embodiments, the process (1400) is executed by processing circuitry, such as the processing circuitry that performs functions of the video encoder (103), the processing circuitry that performs functions of the video encoder (303), and the like. In some embodiments, the process (1400) is implemented in software instructions, thus when the processing circuitry executes the software instructions, the processing circuitry performs the process (1400). The process starts at (S1401) and proceeds to (S1410).

At (S1410), a use of a directional intra prediction for coding a current coding block in a current picture is determined.

At (S1420), the current coding block is determined to be non-square rectangle.

At (S1430), in response to the current coding block being the non-square rectangle, a mapped intra prediction angle is determined, the mapped intra prediction angle is outside a first set of directional intra prediction angles and is mapped to a specific directional intra prediction angle in the first set of directional intra prediction angles, the first set of directional intra prediction angles include predefined nominal angles and finer angles, the finer angles are away from the predefined nominal angles by delta angles.

In some examples, the mapped intra prediction angle is used for a directional intra prediction of the current code block. In an example, a lookup table is accessed according to the mapped intra prediction angle to obtain a derivative value for the directional intra prediction of the current coding block. For a pixel in the current coding block, an offset indicative of a reference location in the current picture is determined according to the derivative value and a location of the pixel. The reference location in the current picture is used for the directional intra prediction of the pixel.

At (S1440), coded information of the current coding block is determined, the coded information is indicative of a specific nominal angle and a specific delta angle that collectively correspond to the specific directional intra prediction angle in the first set of directional intra prediction angles.

In some examples, in response to a height to width ratio or a width to height ratio being larger than a threshold, the mapped intra prediction angle is determined from a mapped subset of directional intra prediction angles, the mapped subset of directional intra prediction angles are mapped from at least a nominal angle of 45° with the delta angles.

In some examples, in response to a height to width ratio of the current coding block being larger than 2, the mapped intra prediction angle is determined from a mapped subset of directional intra prediction angles, the mapped subset of directional intra prediction angles are greater than 203° and are mapped from a first nominal angle of 45° with the delta angles, and a second nominal angle of 67° with the delta angles.

In some examples, in response to a width to height ratio of the current coding block being larger than 2, the mapped intra prediction angle is determined from a mapped subset of directional intra prediction angles, the mapped subset of directional intra prediction angles are smaller than 45° and are mapped from a nominal angle of 203° with the delta angles.

In some examples, in response to a height to width ratio of the current coding block being equal to 2, the mapped intra prediction angle is determined from a mapped subset of directional intra prediction angles, the mapped subset of directional intra prediction angles are greater than 203° and are mapped from a nominal angle of 45° with the delta angles.

In some examples, in response to a height to width ratio of the current coding block being greater than a threshold, the mapped intra prediction angle is determined from a mapped subset of directional intra prediction angles, the mapped subset of directional intra prediction angles are mapped from a nominal angle with a subset of the delta angles at a side of the nominal angle.

In some examples, from an above side and a left side, a first side and a second side are determined. The first side has more intra coded neighboring blocks than the second side. Then, one or more directional intra prediction angle is mapped from the second side to the first side.

In some examples, from an above side and a left side, a first side and a second side are determined. The first side has more directional (angular) intra coded neighboring blocks than the second side. Then, one or more directional intra prediction angle is mapped from the second side to the first side.

In some examples, a reference line index is determined. In response to the reference line index being greater than zero and the current coding block being the non-square rectangle, the mapped intra prediction angle is determined, the mapped intra prediction angle is outside the first set of directional intra prediction angles and is mapped to the specific directional intra prediction angle.

In some examples, a syntax element indicative of an enabling of angle mapping is generated in the encoded information. It is noted that the syntax element can be any suitable high level syntax element, such as a sequence level, a frame level, a slice level, a super block level and the like.

Then, the process proceeds to (S1499) and terminates.

The process (1400) can be suitably adapted. Step(s) in the process (1400) can be modified and/or omitted. Additional step(s) can be added. Any suitable order of implementation can be used.

Figure 15:
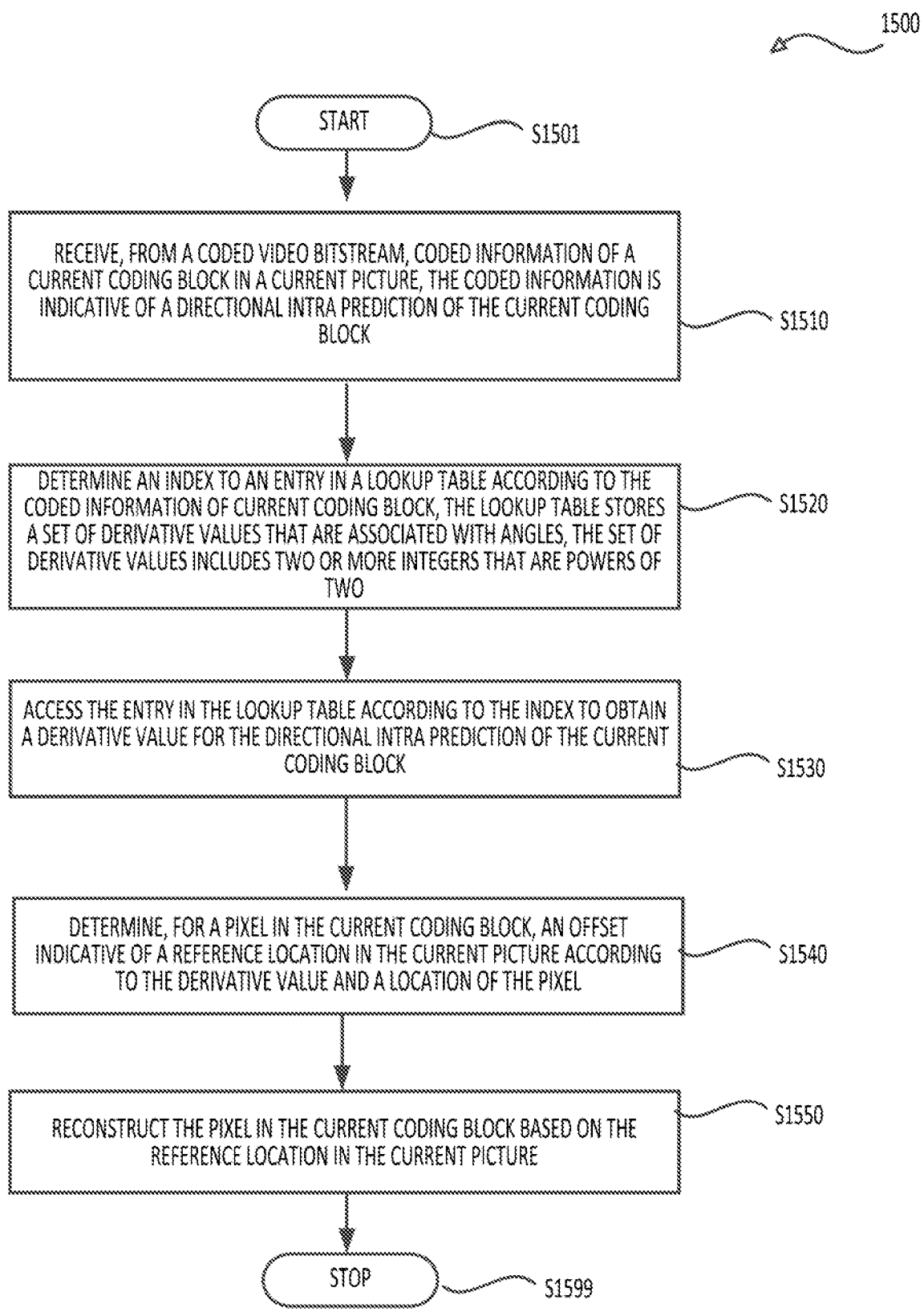
FIG. 15 shows a flow chart outlining another process according to some embodiment of the disclosure.

FIG. 15 shows a flow chart outlining a process (1500) according to an embodiment of the disclosure. The process (1500) can be used in a video decoder. In various embodiments, the process (1500) is executed by processing circuitry, such as the processing circuitry that performs functions of the video decoder (110), the processing circuitry that performs functions of the video decoder (210), and the like. In some embodiments, the process (1500) is implemented in software instructions, thus when the processing circuitry executes the software instructions, the processing circuitry performs the process (1500). The process starts at (S1501) and proceeds to (S1510).

At (S1510), from a coded video bitstream, coded information of a current coding block in a current picture is received. The coded information is indicative of a directional intra prediction of the current coding block.

At (S1520), an index to an entry in a lookup table (e.g., angle-to-offset mapping lookup table) is determined according to the coded information of current coding block, the lookup table stores a set of derivative values that are associated with angles, the set of derivative values includes two or more integers that are powers of two.

At (S1530), the entry in the lookup table is accessed according to the index to obtain a derivative value for the directional intra prediction of the current coding block.

At (S1540), for a pixel in the current coding block, an offset indicative of a reference location in the current picture is determined according to the derivative value and a location of the pixel.

At (S1550), the pixel in the current coding block is reconstructed based on the reference location in the current picture.

In some examples, the set of derivative values in the lookup table includes all integers that are powers of two between a minimum value in the set of derivative values and a maximum value in the set of derivative values. In an example, the set of derivative values are limited to N number of bits, and N is a positive integer, the set of derivative values includes $2^i$, $i \in [1, 2 \ldots, N]$.

In some examples, each difference of two adjacent derivative values in the set of derivative values is multiples of 2.

In some examples, the set of derivative values are associated with the angles that increase, differences between adjacent derivative values in the set of derivative values change in a monotonically manner, such as monotonically decrease.

In some examples, the set of derivative values includes a diagonal derivative value associated with 45° angle, and a derivative pair including a first derivative value and a second derivative value that are at different sides of the 45° angle and with a same absolute index difference to the diagonal derivative value, a product of the first derivative value and the second derivative value is within a range about a square of the diagonal derivative value. In an example, the square of the diagonal derivative value is one of 2048, 4096 and 8192. In some examples, the product of the first derivative value and the second derivative value is within [T−d, T+d], T denotes the square of the diagonal derivative value, and d denotes a predefined range parameter.

Then, the process proceeds to (S1599) and terminates.

The process (1500) can be suitably adapted. Step(s) in the process (1500) can be modified and/or omitted. Additional step(s) can be added. Any suitable order of implementation can be used.

Figure 16:
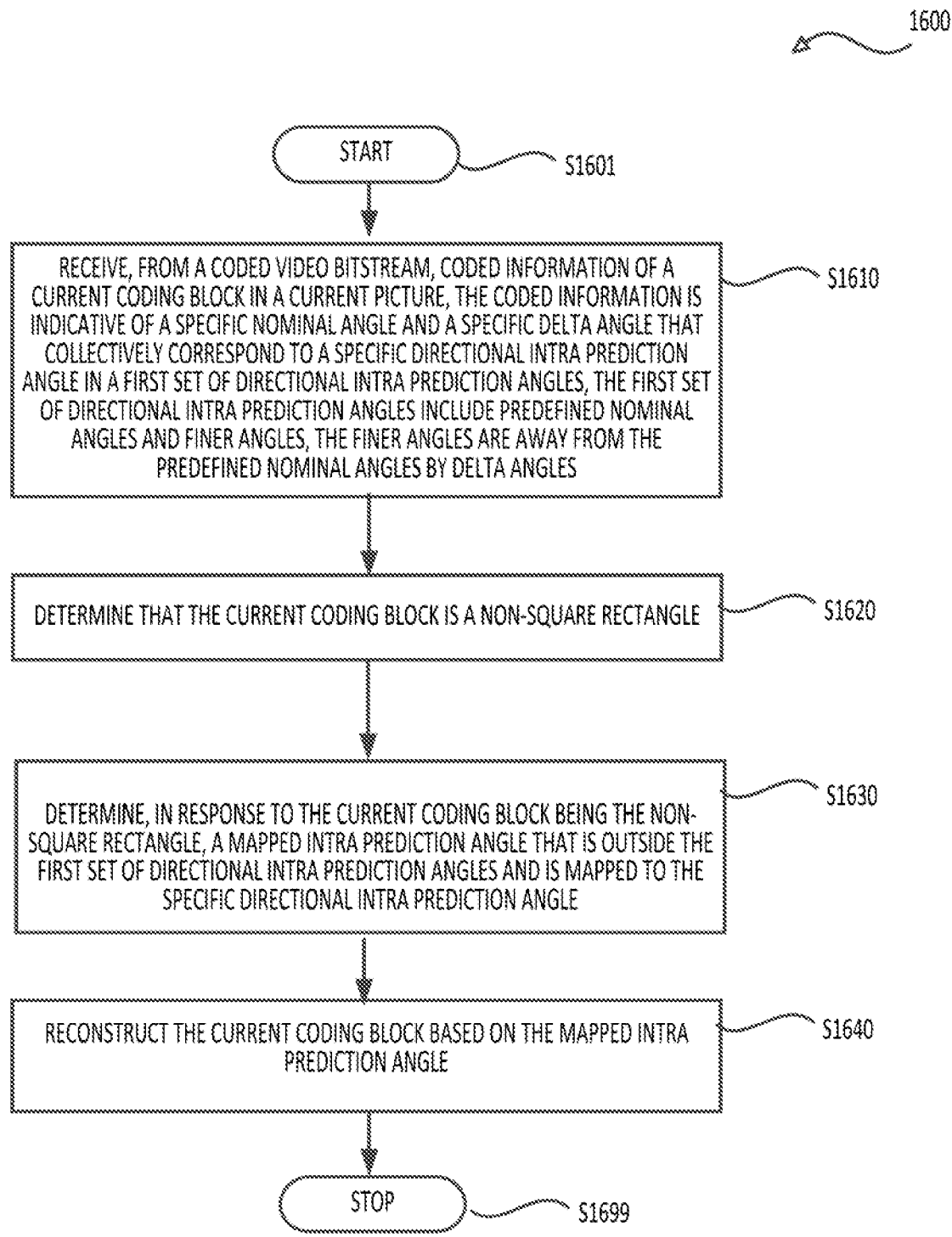
FIG. 16 shows a flow chart outlining another process according to some embodiment of the disclosure.

FIG. 16 shows a flow chart outlining a process (1600) according to an embodiment of the disclosure. The process (1600) can be used in a video decoder. In various embodiments, the process (1600) is executed by processing circuitry, such as the processing circuitry that performs functions of the video decoder (110), the processing circuitry that performs functions of the video decoder (210), and the like. In some embodiments, the process (1600) is implemented in software instructions, thus when the processing circuitry executes the software instructions, the processing circuitry performs the process (1600). The process starts at (S1601) and proceeds to (S1610).

At (S1610), from a coded video bitstream, coded information of a current coding block in a current picture is receive. The coded information is indicative of a specific nominal angle and a specific delta angle that collectively correspond to a specific directional intra prediction angle in a first set of directional intra prediction angles, the first set of directional intra prediction angles includes predefined nominal angles and finer angles, the finer angles are away from the predefined nominal angles by delta angles.

At (S1620), the current coding block is determined to be a non-square rectangle.

At (S1630), in response to the current coding block being the non-square rectangle, a mapped intra prediction angle is determined, the mapped intra prediction angle is outside the first set of directional intra prediction angles and is mapped to the specific directional intra prediction angle.

At (S1640), the current coding block is reconstructed based on the mapped intra prediction angle.

In some examples, in response to a height to width ratio or a width to height ratio being larger than a threshold, the mapped intra prediction angle is determined from a mapped subset of directional intra prediction angles, the mapped subset of directional intra prediction angles are mapped from at least a nominal angle of 45° with the delta angles.

In some examples, in response to a height to width ratio of the current coding block being larger than 2, the mapped intra prediction angle is determined from a mapped subset of directional intra prediction angles, the mapped subset of directional intra prediction angles are greater than 203° and are mapped from a first nominal angle of 45° with the delta angles, and a second nominal angle of 67° with the delta angles.

In some examples, in response to a width to height ratio of the current coding block being larger than 2, the mapped intra prediction angle is determined from a mapped subset of directional intra prediction angles, the mapped subset of directional intra prediction angles are smaller than 45° and are mapped from a nominal angle of 203° with the delta angles.

In some examples, in response to a height to width ratio of the current coding block being equal to 2, the mapped intra prediction angle is determined from a mapped subset of directional intra prediction angles, the mapped subset of directional intra prediction angles are greater than 203° and are mapped from a nominal angle of 45° with the delta angles.

In some examples, in response to a height to width ratio of the current coding block being greater than a threshold, the mapped intra prediction angle is determined from a mapped subset of directional intra prediction angles, the mapped subset of directional intra prediction angles are mapped from a nominal angle with a subset of the delta angles at a side of the nominal angle.

In some examples, from an above side and a left side, a first side and a second side are determined. The first side has more intra coded neighboring blocks than the second side. Then, one or more directional intra prediction angle is mapped from the second side to the first side.

In some examples, from an above side and a left side, a first side and a second side are determined. The first side has more directional (angular) intra coded neighboring blocks than the second side. Then, one or more directional intra prediction angle is mapped from the second side to the first side.

In some examples, a reference line index is determined. In response to the reference line index being greater than zero and the current coding block being the non-square rectangle, the mapped intra prediction angle is determined, the mapped intra prediction angle is outside the first set of directional intra prediction angles and is mapped to the specific directional intra prediction angle.

In some examples, a syntax element is indicative of an enabling of angle mapping is determined. In response to the syntax element being indicative of the enabling of angle mapping and the current coding block being the non-square rectangle, the mapped intra prediction angle is determined. The mapped intra prediction angle is outside the first set of directional intra prediction angles and is mapped to the specific directional intra prediction angle. It is noted that the syntax element can be any suitable high level syntax element, such as a sequence level, a frame level, a slice level, a super block level and the like.

Then, the process proceeds to (S1699) and terminates.

The process (1600) can be suitably adapted. Step(s) in the process (1600) can be modified and/or omitted. Additional step(s) can be added. Any suitable order of implementation can be used.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
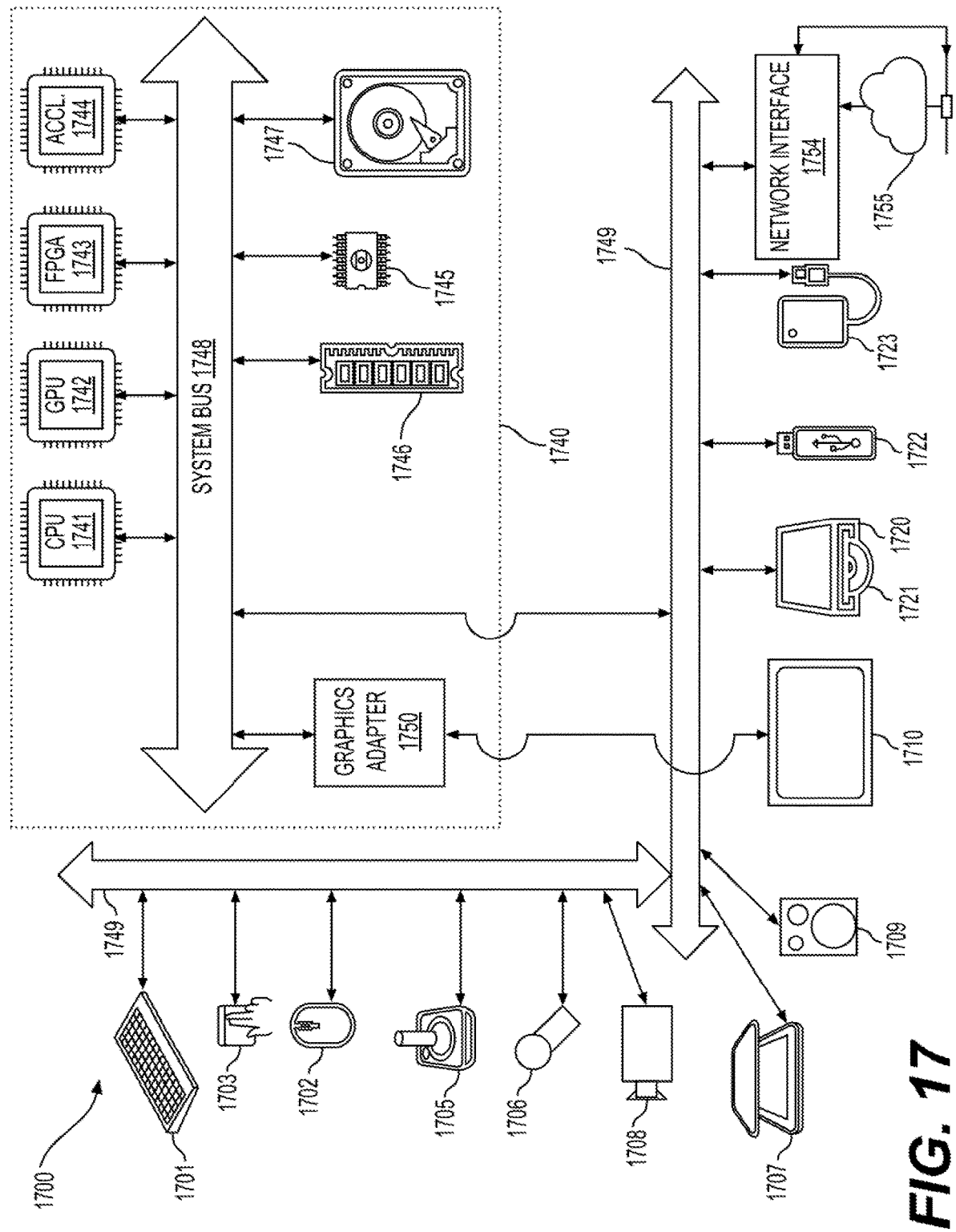
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface (1754) to one or more communication networks (1755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), graphics adapters (1750), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). In an example, the screen (1710) can be connected to the graphics adapter (1750). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving, from a coded video bitstream, coded information of a current coding block in a current picture, the coded information being indicative of a directional intra prediction of the current coding block;
determining an index to an entry in an angle-to-offset mapping lookup table according to the coded information of current coding block, the angle-to-offset mapping lookup table storing a set of derivative values that are associated with angles, wherein the set of derivative values in the angle-to-offset mapping lookup table comprise all integers that are powers of two from 2 to 2048;
accessing the entry in the angle-to-offset mapping lookup table according to the index to obtain a derivative value for the directional intra prediction of the current coding block;
determining, for a pixel in the current coding block, an offset indicative of a reference location in the current picture according to the derivative value and a location of the pixel; and
reconstructing the pixel in the current coding block based on the reference location in the current picture.

2. The method of claim 1, further comprising:
using a shifting operation to perform a multiplication operation when a derivative value of powers of 2 is used in the multiplication operation.

3. The method of claim 1, wherein each difference of two adjacent derivative values in the set of derivative values is multiples of 2.

4. The method of claim 1, wherein the set of derivative values are associated with the angles that increase, differences between adjacent derivative values in the set of derivative values change in a monotonically manner.

5. The method of claim 1, wherein the set of derivative values comprises a diagonal derivative value associated with 45° angle, and a derivative pair including a first derivative value and a second derivative value that are with a same absolute index difference to the diagonal derivative value, a product of the first derivative value and the second derivative value is within a range about a square of the diagonal derivative value.

6. The method of claim 5, wherein the square of the diagonal derivative value is one of 2048, 4096 and 8192.

7. The method of claim 5, wherein the product of the first derivative value and the second derivative value is within [T−d, T+d], T denotes the square of the diagonal derivative value, and d denotes a predefined range parameter.

8. A method of processing visual media data, the method comprising:
processing a bitstream that includes the visual media data according to a format rule, wherein
the bitstream includes coded information of a current coding block in a current picture; and the format rule specifies that:
- the coded information is indicative of a directional intra prediction of the current coding block,
- an index to an entry in an angle-to-offset mapping lookup table is determined,
- the angle-to-offset mapping lookup table stores a set of derivative values that are associated with angles, wherein the set of derivative values in the angle-to-offset mapping lookup table comprise all integers that are powers of two from 2 to 2048,
- a derivative value for the directional intra prediction of the current coding block is obtained based on the entry in the angle-to-offset mapping lookup table according to the index,
- an offset indicative of a reference location in the current picture is determined according to the derivative value and a location of a pixel in the current coding block; and
- the pixel in the current coding block is reconstructed based on the reference location in the current picture.

9. The method of claim 8, wherein the format rule further specifies that:
- a shifting operation is used to perform a multiplication operation when a derivative value of powers of 2 is used in the multiplication operation.

10. The method of claim 8, wherein each difference of two adjacent derivative values in the set of derivative values is multiples of 2.

11. The method of claim 8, wherein the set of derivative values are associated with the angles that increase, differences between adjacent derivative values in the set of derivative values change in a monotonically manner.

12. The method of claim 8, wherein the set of derivative values comprises a diagonal derivative value associated with 45° angle, and a derivative pair including a first derivative value and a second derivative value that are with a same absolute index difference to the diagonal derivative value, a product of the first derivative value and the second derivative value is within a range about a square of the diagonal derivative value.

13. The method of claim 12, wherein the square of the diagonal derivative value is one of 2048, 4096 and 8192.

14. The method of claim 12, wherein the product of the first derivative value and the second derivative value is within [T−d, T+d], T denotes the square of the diagonal derivative value, and d denotes a predefined range parameter.

* * * * *